United States Patent [19]

Springer et al.

[11] Patent Number: 5,297,921
[45] Date of Patent: Mar. 29, 1994

[54] RELEASABLE LOCKING DEVICE

[75] Inventors: Scott L. Springer; David A. Spence, both of Milwaukee, Wis.

[73] Assignee: Rite-Hite Corporation, Milwaukee, Wis.

[21] Appl. No.: 89,404

[22] Filed: Jul. 8, 1993

Related U.S. Application Data

[63] Continuation of Ser. No. 744,338, Aug. 13, 1991, abandoned.

[51] Int. Cl.⁵ .............................................. B65G 69/00
[52] U.S. Cl. .................................... 414/401; 414/396
[58] Field of Search .................... 414/396, 401, 584; 410/7; 14/71.1, 71.7

[56] References Cited

U.S. PATENT DOCUMENTS

| | | | |
|---|---|---|---|
| 4,264,259 | 4/1981 | Hipp | 414/401 |
| 4,282,621 | 8/1981 | Anthony et al. | 414/401 X |
| 4,373,847 | 2/1983 | Hipp et al. | 414/401 |
| 4,443,150 | 4/1984 | Hahn et al. | 414/401 |
| 4,472,099 | 9/1984 | Hahn et al. | 414/401 |
| 4,488,325 | 12/1984 | Bennett et al. | 414/401 X |
| 4,560,315 | 12/1985 | Hahn et al. | 414/401 |
| 4,695,216 | 9/1987 | Erlandsson | 414/401 |
| 4,759,678 | 7/1988 | Hageman | 414/401 |
| 4,815,918 | 3/1989 | Bennett et al. | 414/401 |
| 4,830,563 | 3/1989 | Yeakle | 414/401 |
| 4,887,954 | 12/1989 | Gregerson et al. | 414/401 |
| 4,963,068 | 10/1990 | Gelder | 414/401 |
| 4,988,254 | 1/1991 | Alexander | 414/401 |

Primary Examiner—Michael S. Huppert
Assistant Examiner—James Keenan
Attorney, Agent, or Firm—Leydig, Voit & Mayer, Ltd.

[57] ABSTRACT

A device for releasably locking a parked vehicle at a loading dock during loading and unloading thereof. The device is provided with a carriage mounted for vertical adjustment relative to the front wall of the dock and adapted to be yieldably engaged by a depending safety bar of the parked vehicle. A hook-like member is mounted on the carriage for independent rectilinear movement between an operative mode wherein the vehicle safety bar is lockingly engaged thereby and an inoperative safety bar-release mode. A power-actuated unit is mounted on the carriage and is connected by a linkage assembly to the hook-like member and effects movement thereof between the operative and inoperative modes. The linkage assembly includes a pair of pivotally connected links one of which has an end portion pivotally connected to the hook-like member and the other has an end portion pivotally connected to a lower portion of the carriage. One of the links is pivotally connected to a movable portion of the unit and when the latter is moving in one relative direction causes the linkage assembly to move the hook-like member to the operative mode. When the unit portion is moved in a second relative direction, the linkage assembly moves the hook-like member to the inoperative mode. A control assembly is operatively connected to the power-actuated unit and is adapted to selectively actuate and deactuate the power-actuated unit.

15 Claims, 3 Drawing Sheets

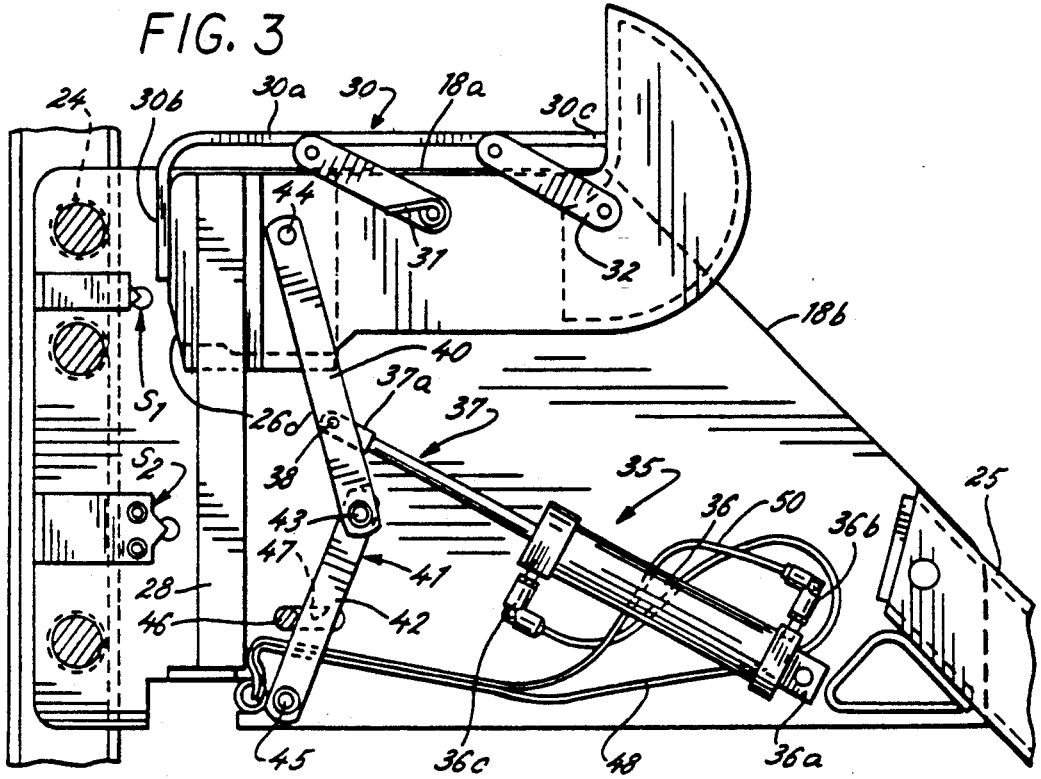
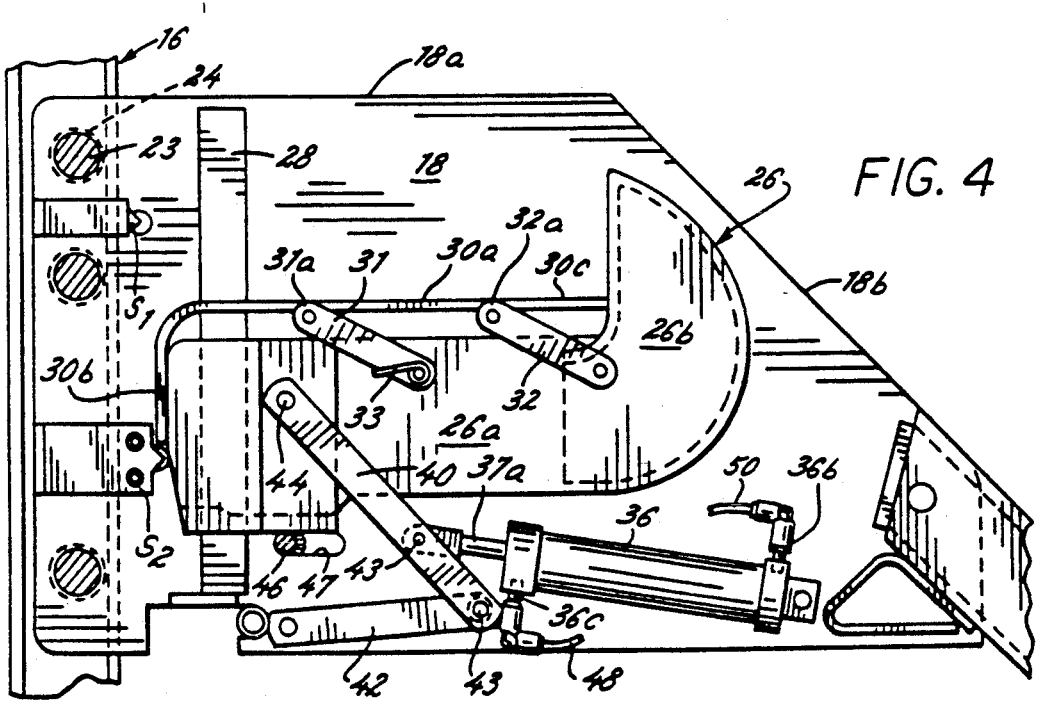

RELEASABLE LOCKING DEVICE

This is a continuation of copending application(s) Ser. No. 744,338 filed on Aug. 13, 1991, now abandoned.

BACKGROUND OF THE INVENTION

1. Field of the Invention

The invention hereinafter disclosed relates to a safety device utilized at a loading dock to prevent accidental or unauthorized moving of a parked vehicle away from the dock while the vehicle is being loaded or unloaded.

2. Description of Related Art

Various locking devices, such as disclosed in Hahn, et al. U.S. Pat. No. 4,443,150, have heretofore been utilized to retain a parked vehicle against a loading dock while the vehicle is being loaded or unloaded. While the locking device disclosed in the aforenoted patent is effective in restraining such parked vehicle, it nevertheless is possessed of certain shortcomings such as: a) it relies upon a manual upward pull to effect a locking engagement between the device and a safety bar, commonly referred to as an ICC bar which is disposed at the rear end of the vehicle and depends from the underside thereof; b) the adjustment of the device to an operative locking mode and an inoperative release mode requires the manual manipulation of a tool to effect engagement with certain portions of the device which under certain circumstances may be a frustrating, awkward or time-consuming operation; furthermore, the tool may become lost or misplaced; c) the means for locking the device in an operative mode may be adversely affected by snow, ice and debris; d) signal lights indicating whether the hook member is in an operative or inoperative mode must be manually actuated and e) there is no audible signal if the ICC bar cannot be engaged by the hook member.

Other locking devices besides that disclosed in U.S. Pat. No. 4,443,150, may be susceptible to being damaged by the vehicle when backing into a parked position adjacent the loading dock or they may be of complex and costly design and highly susceptible to malfunction.

SUMMARY OF THE INVENTION

Thus, an improved locking device has been provided which readily avoids the aforenoted shortcomings besetting prior devices of this general type.

The improved locking device embodies simple mechanical structures, which are durable and may be readily serviced when required.

The improved locking device can be readily controlled from a remote, safe and sheltered location.

The improved locking device can be readily installed at an existing dock and utilized in concert with other loading dock accessories such as a dock leveler, bumper pads and the like.

Further and additional advantages, possessed by the improved locking device will become apparent from the description, accompanying drawings and appended claims.

In accordance with one embodiment of the invention, a releasable locking device is provided which includes a carriage having an upright first section affixed to the front wall of a conventional loading dock. The carriage also includes a second section which is mounted on the first section for substantially vertical movement and is adapted to yieldably engage the depending safety bar of a parked vehicle. The carriage second section is upwardly biased to assume a predetermined elevated position. As the vehicle is backing towards the loading dock into a parked position, the carriage second section is initially engaged by the safety bar of the vehicle. As the vehicle continues the backing maneuver, the safety bar causes the carriage second section to be automatically cammed downwardly from the upwardly biased position allowing the safety bar to slidably engage a predetermined upper edge portion of the second section.

The carriage second section has a hook-like member mounted thereon for independent substantially rectilinear vertical movement between an operative vehicle-locking mode and an inoperative vehicle-release mode. Also mounted on the carriage second section is a power-activated unit which is operatively connected to the hook member via a linkage assembly. When the unit is power-activated in one direction the linkage assembly will automatically move the hook member to and retain same in the operative mode. The power-activated unit is selectively controlled from a remote location relative to the carriage.

DESCRIPTION OF THE DRAWINGS

FIG. 3 is similar to FIG. 2 but with the sensor piece not being engaged by the vehicle safety bar.

FIG. 4 is similar to FIG. 3 but showing the hook member in a fully retracted inoperative mode.

DESCRIPTION

Figure 1:
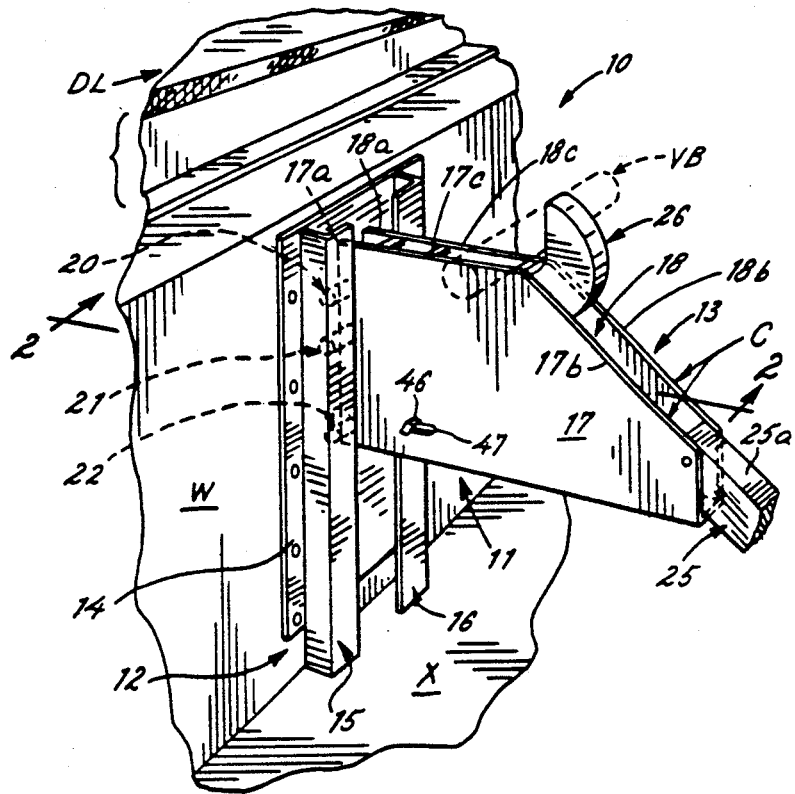
FIG. 1 is a fragmentary perspective view of a preferred embodiment of the improved locking device shown in an operative mode and mounted on the front wall of a loading dock; the hook member of the device being shown in locking engagement with the safety bar of the parked vehicle; said bar being shown in phantom lines.

Referring now to the drawings and more particularly to FIG. 1, a preferred embodiment of the improved locking device 10, sometimes referred to as a vehicle restraint, is shown installed on the front wall W of a conventional loading dock or platform. The device 10, as illustrated, may be utilized in concert with a dock leveler DL of a type such as disclosed in U.S. Pat. No. 3,699,601. The dock leveler, as illustrated, is mounted within a pit customarily formed in the upper surface of the dock and extending to the front wall thereof. The dock leveler DL forms no part of the claimed invention. The locking device 10 to be hereinafter described, is mounted on the dock front wall beneath the bottom of the pit and substantially equidistant from the pit sidewalls.

Locking device 10 includes a carriage 11 having an elongate upwardly extending guide or first section 12 which is anchored to the dock front wall W. Mounted for vertical movement on the guide section 12 is a carriage second section 13. Guide section 12, in the illustrated embodiment, includes a planar mounting plate 14. The lower edge of plate 14 may engage or be in close proximity to the roadway X on which the vehicle is parked during the loading and unloading operations.

Secured by welding or the like to the exposed surface of plate 14 is a pair of vertically extending, spaced, parallel guideways 15, 16. Each guideway preferably has an inverted L configuration with a first leg thereof projecting perpendicularly outwardly from the plate exposed surface. The second leg of each guideway is spaced from plate 14 and extends at a right angle from the first leg and towards the second leg of the other guideway.

The carriage second section 13 includes a pair of planar side plate members 17, 18 which are of substantially like configuration and define spaced parallel vertical planes. Each plate member extends perpendicularly outwardly from the mounting plate 14 of the carriage first section. The inner edge portions 17a, 18a of plate members 17, 18, that is the edges adjacent the mounting plate 14, are interconnected by a plurality of vertically spaced guide units 20, 21 and 22, see FIG. 2. Each unit is of like construction and may include an axle 23 which is disposed transversely of the plate members and extends through laterally aligned openings formed in the plate member inner edge portions. Each end of the axle terminates in a roller 24 which is disposed on the exposed side of the adjacent plate member and is sized to slidably fit between the mounting plate 14 and the second leg of the adjacent guideway 15 or 16. Each axle has the ends thereof welded to the corresponding laterally aligned openings of the plate members. The guide units 20–22 are relatively positioned so that the carriage second section 13 remains in continuous perpendicular relation with the first section 12 while moving relative thereto in a vertical direction.

Carriage second section 13 is biased in an upward direction to a predetermined elevated rest position by springs, not shown, which may be of a type as disclosed in the aforenoted U.S. Pat. No. 4,443,150. Other suitable means besides coil springs may be used as a biasing means.

The outer edge portion 17b, 18b of each plate member 17, 18 extends diagonally downwardly and outwardly a like amount forming a cam surface C the function of which will be described more fully hereinafter. The upper end of each cam surface terminates in a horizontally disposed upper edge position 17c, 18c of the plate member.

If desired, an elongate cam extension 25 may be pivotally mounted on the lower outer edge portions of the plate members, see FIG. 3. The extension 25 is optional be of a type disclosed in U.S. Pat. No. 4,560,315. Such extension forms no part of the claimed invention. It will be noted in FIG. 3 that the exposed upper edge 25a of the extension 25 functions as a downward continuation of cam surface C when the carriage second section 13 assumes the elevated rest position. In the event the carriage second section 13 is moved downwardly by the safety bar VB of a backing vehicle so that the lower end of the extension strikes the roadway X, the extension will automatically pivot upwardly and thus, will not obstruct the downward movement of the carriage second section.

Figure 5:
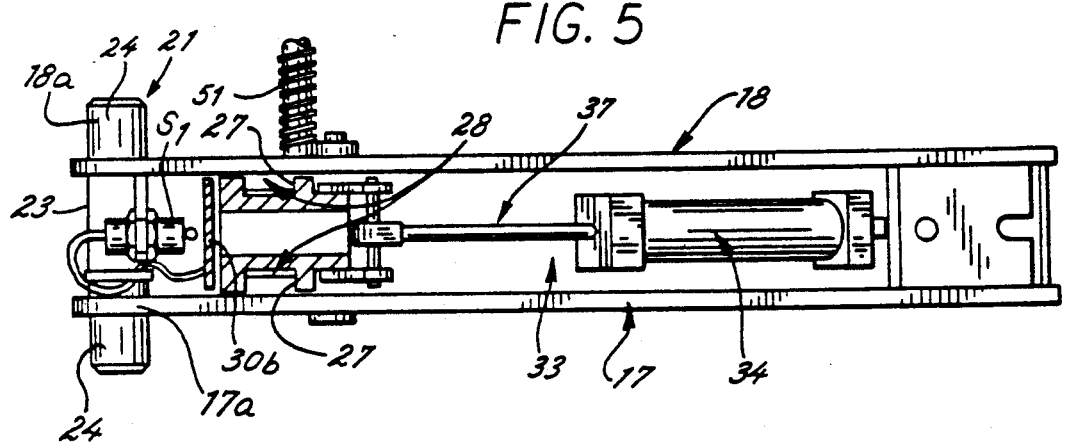
FIG. 5 is an enlarged, fragmentary top view of the locking device of FIG. 3 with the sensor piece and a cam extension removed.

Mounted for independent movement on the carriage second section and disposed between the plate members 17 and 18 is a hook member 26. Member 26 includes an elongate horizontally disposed inner section 26a and an outer section 26b, the latter extending upwardly from the distal end of the inner section, see FIG. 2. The end portion 26c of the inner section opposite outer section 26b is preferably of increased thickness and is provided with opposed vertically extending rectilinear side channels or grooves 27. Each channel 27 is adapted to slidably accommodate a vertically disposed rail 28. Each rail is affixed to the concealed surface of the adjacent plate member 17, 18. The rails are in opposed parallel relation and the longitudinal axis of each rail is substantially perpendicular to the plate member upper edge portion 17c, 18c. Thus, the coaction between the rails and corresponding channels restricts the independent movement of the hook-like member 26 to only a substantially rectilinear vertical path, see FIGS. 2 & 5.

Figure 2:
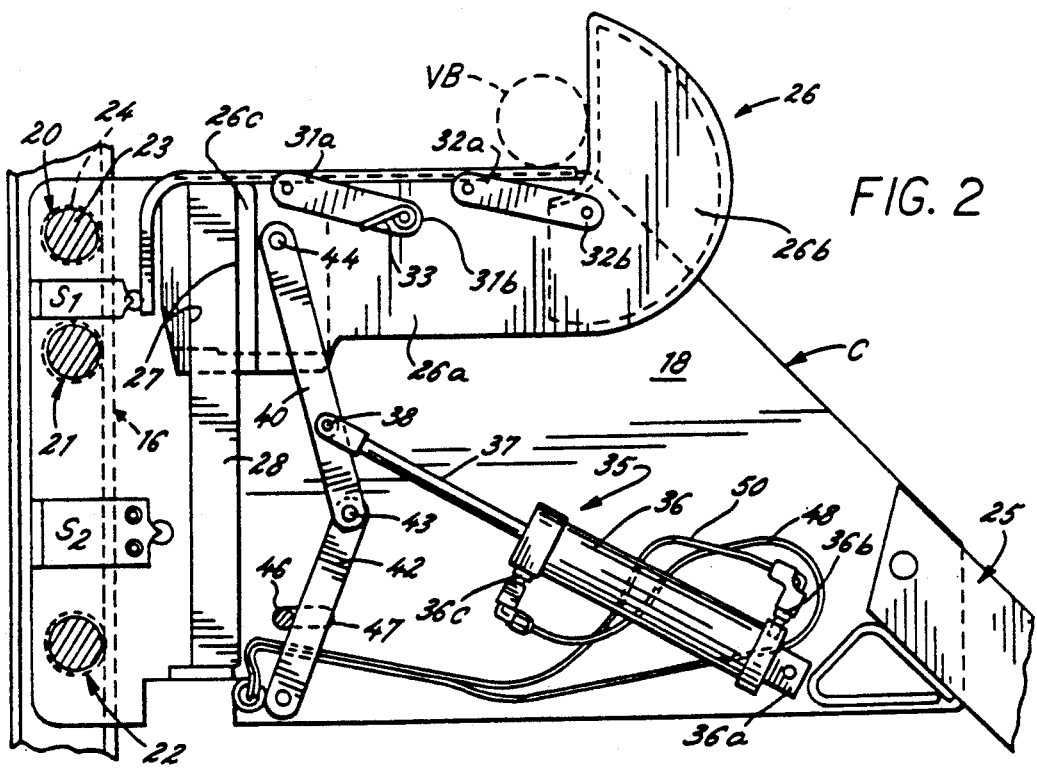
FIG. 2 is an enlarged, fragmentary sectional view taken along line 2—2 of FIG. 1 and showing a sensor piece carried by the hook member being fully depressed by the vehicle safety bar, the latter shown in phantom lines.

As seen in FIGS. 2–4, the hook member 26 is provided with a sensor piece or member 30, the latter having an inverted substantially L-shape configuration. A longer, or first, arm 30a of the sensor piece overlies the upper surface of the hook member inner section 26a and a shorter, or second, arm 30b of the sensor piece depends from the inner end of the first arm and is disposed between the end portion 26c of the hook member 26 and the outer portions of the guideways 15, 16. Pivotally connected to the underside of the first arm 30a are the ends 31a and 32a of a pair of elongate connector arm 31, 32. The arms are disposed between plate members 17 and 18 and are in laterally or horizontally spaced relation and have the corresponding opposite ends 31b, 32b thereof pivotally attached to section 26a of the hook member 26. The connector arms are parallel to one another and extend angularly downwardly and outwardly from the underside of the sensor piece first arm 30a. As noted in FIGS. 2–4 the end 31b of connector arm 31 in engaged by a bias spring 33 which exerts a clockwise force on arm 31 causing the sensor piece 30 to normally assume the raised position relative to the hook member 26, as shown in FIGS. 3 and 4. The clockwise movement of the connector arms 31 and 32 is limited by the distal end 30c of the sensor piece abutting the outer section 26b of the hook member 26. Because the pivotal connections between the hook member section 26a and the ends 31b, 32b of the connector arms are disposed a greater distance from the guide section 12 than the corresponding connections between the opposite ends 31a, 32a of the connector arms and the underside of sensor piece arm 30a, the sensor piece 30 simultaneously moves in both horizontal and vertical directions while arm 30a remains in a horizontal position.

As seen in FIG. 3, when the sensor piece 30 is in relatively raised position, the second arm 30b of the sensor piece is spaced outwardly from a mechanical plunger type switch $S_1$ which is fixedly mounted on rear portions of the plate members 17 and 28 between guide units 20, 21. When the sensor piece 30 is engaged and depressed by the safety bar VB of the parked vehicle, the second arm 30b of the sensor piece will move horizontally towards the guide section 12 an amount sufficient to depress the exposed button of switch $S_1$. The function of switch $S_1$ will be discussed more fully hereinafter.

A second mechanical plunger type switch $S_2$, see FIG. 2–4 is fixed mounted on a lower portion of the plate members 17 and 18 adjacent the guide section 12. Switch $S_2$ is disposed in the line of travel of hook member 26 so that when the latter has reached its fully retracted position, see FIG. 4 relative to the plate members 17 and 18, the end of the inner section 26a of the hook member 26, which is provided with a cam surface 26d, engages the exposed button of switch $S_2$ and depresses same. The switches S₁ and S₂ are actuated independently of one another and such switches form components of an electrical circuit which includes a remotely located control box or panel 34, and visual signal means such as sets of conventional red/green signal lights and audio signal means such as a horn or bell. One set of signal lights and horns are normally located inside in proximity to the control box and the other sets are normally located outside in proximity to the carriage 11 where the signal lights can be readily observed and the sound of the horn can be readily heard by the driver of the vehicle when seated at the vehicle operating controls. Thus, switch S₂ monitors the ultimate downward or fully retracted position of the hook member 26 relative to the carriage plate members 17 and 18.

When switch S₁ has been actuated by the sensor piece arm 30b see FIG. 2, the set of signal lights proximate the control box, or panel 34 will have the green light illuminated which at the same time the red light of the other, or outside, set of signal lights will be illuminated. When the sensor piece 30 has not been fully depressed by the vehicle safety bar, the red light of the inside and outside signal lights are illuminated and the horn is activated indicating that it is unsafe to load or unload the parked vehicle. The green light of the outside set of signal lights is only illuminated whenever the sensor piece is not depressed and the hook member portion 26d is engaging switch S₂, see FIG. 4.

While switches S₁ and S₂ have been identified as mechanical plunger type switches, other types of switches may be substituted therefor.

The hook member 26 is raised and lowered in a vertical path relative to the carriage second section by a piston-cylinder unit 35 which is disposed between plate members 17, 18. The unit 35 is preferably pneumatically actuated. Cylinder 36 of unit 35 has one end 36a thereof pivotally connected to corresponding lower, outwardly disposed portions of the plate members 17, 18, see FIG. 3.

A rod 37a of the piston 37 of unit 35 projects rearwardly from the opposite end of cylinder 36 in an angular direction towards the carriage first section 12. The exposed end of rod 37a is pivotally connected by pin 38 to one link 40 of a linkage assembly 41. The assembly provides a linkage between the piston 37 and the hook member 26. The assembly 41 includes a second link 42 which is connected at an upper end to a lower end of link 40 by a pivot pin 43. The upper end of link 40 is connected by a pivot pin 44 to the rear-end portion 26c of the hook member 26. The lower end of link 42, on the other hand, is pivotally connected by pivot pin 45 to corresponding lower portions of plate members 17 and 18 which are in proximity to the carriage first section 12. Thus, when piston rod 37a is moved outwardly from cylinder 36 towards the carriage first section, the links 40 and 42 of the linkage assembly will move towards an aligned relation—that is to say the included angle progressively increases—whereupon the hook member 26 will assume its uppermost, or operative, position, relative to the plate members 17, 18. The uppermost relative position of the hook member 26 is controlled by a stop pin 46 which extends transversely between plate members 17, 18 and has opposite ends thereof extending through corresponding elongate slots 47 formed in the plate members, see FIG. 3. The slots extend longitudinally in a direction perpendicular to the rails 28. The stop pin 46 may be selectively positioned in the slots by lock nuts threaded onto the ends of the stop pin. The stop pin is adapted to engage the link 42 of the linkage assembly when the latter is being actuated by the piston rod 37a as the latter is moved outwardly from cylinder 36 to adjust the vertical upward travel of hook member 26.

Figure 6:
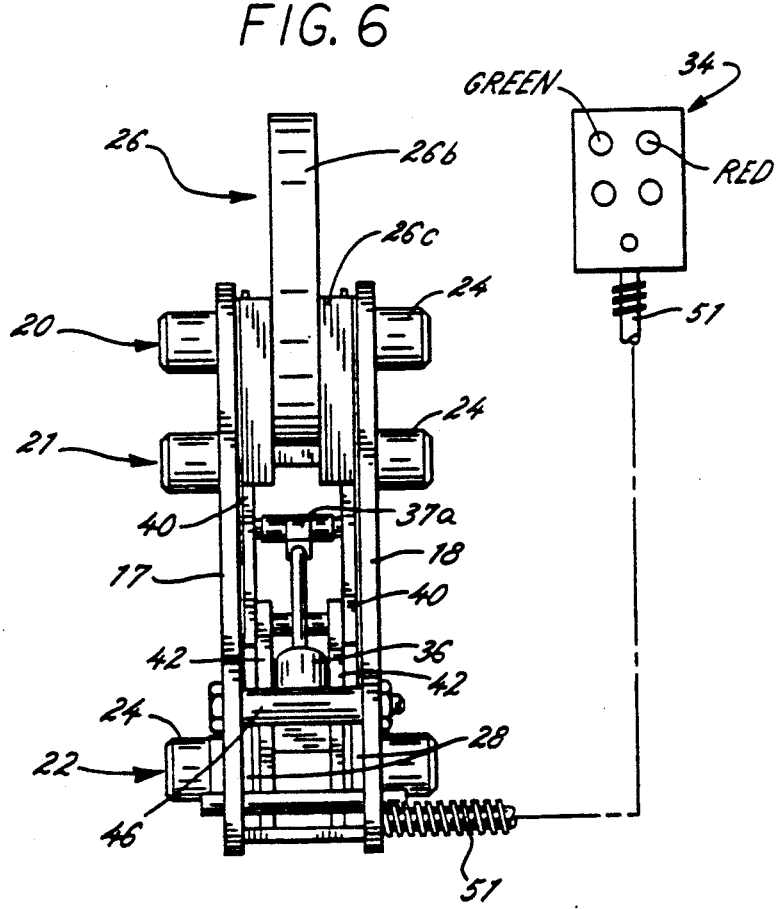
FIG. 6 is an enlarged, fragmentary right side elevational view of the locking device of FIG. 5.

The actuation of the piston-cylinder unit 35 is controlled by control panel 34, see FIG. 6, which is preferably mounted at a remote location (e.g. inside the warehouse or plant and adjacent the doorway serviced by the locking device) which is sheltered and protected from unauthorized use of the device when the doorway, or station, is not being used. The control panel 34 works in concert with a suitable pump, not shown and controls the relative pressure within hoses 48 and 50 connected to cylinder 36, which in turn controls the up and down motion of the hook member 26. A manually actuated on/off switch, not shown, may be included in the electrical circuit for the sets of signal lights and horn.

As seen in FIGS. 2-4, hose 50 has an end thereof connected to a lower port 36b provided on cylinder 36. A second end of hose 50 is connected to an air pump or source of compressed air, not shown. Once the hook member 26 has reached its fully extended position or operative mode, it is maintained in such position by the air pressure within hose 50. A manually controlled switch on control panel 34 permits the air pressure within hose 50 to be transferred to hose 18, which has an end thereof connected to an upper port 36c provided on cylinder 36, causing the piston rod to retract into cylinder 36 and the hook member to assume an inoperative vehicle-release position.

The air hose and electrical wiring from the control panel 34 to the carriage second section 13 are contained within a flexible harness or conduit 51 which may be of durable, moisture-proof and insulative material. The control panel 34, as aforementioned may incorporate visual as well as audio signals which are commonly utilized in vehicle restraints of this general type to alert both dock personnel and vehicle operators as to whether the hook member 26 is in a locked or unlocked relation with respect to the vehicle safety bar VB. As aforenoted the extension 25 is optional. The locking device 10 without the extension 25, is capable of accommodating vehicle safety bars which are disposed from about 15" to about 30" above the level of roadway X.

While the locking device has heretofore been described utilizing a pneumatic power source for actuating hook member through the linkage assembly other power sources such as hydraulic or electro-mechanical may be substituted therefor.

Thus, an improved locking device has been disclosed which is of simple construction; may be readily installed; is reliable in operation; may be easily and expeditiously serviced when required; and may accommodate a variety of vehicle safety bars.

I claim:

1. A releasable locking device for securing a parked vehicle to an adjacent structure, said device comprising a carriage having a first section adapted to be affixed to the adjacent structure, and a second section including an interior space and mounted for substantially vertical movement on said first section and biased to yieldably assume a predetermined elevated position, said second section being movable downwardly from said elevated position upon an external force of a predetermined magnitude being exerted on said second section; a first means mounted on and carried with said carriage second section for relative substantially rectilinear movement with respect thereto between an operative vehicle-locking mode and an inoperative vehicle-release mode wherein said first means is housed within the interior space of the second section; power-actuated second means mounted on, carried with, and housed within the interior space of said carriage second section for effecting movement of said first means between said operative and inoperative modes; linkage assembly disposed on, carried with, and housed within the interior space of said carriage second section and interconnecting said first and second means, said assembly including a first linear link having one end portion thereof connected for pivotal movement with respect to said first means and depending therefrom, and a second linear link having one end portion thereof connected for pivotal movement with respect to a depending second end portion of said first linear link and having a second end portion connected for pivotal movement with respect to said carriage second section at a location spaced beneath said first means when the latter is in either of said modes, one of said links being connected intermediate said first and second ends to said second means, said connection providing pivotal movement with respect to said second means, said second means when actuated in one direction causing said links to assume and be retained in a predetermined angular relation whereby said first means is disposed in said operative mode; and third means operatively connected to said second means for indicating the mode of said first means.

2. The releasable locking device of claim 1 wherein the carriage second section projects outwardly from said first section in a direction towards the parked vehicle and said power-actuated second means has one end portion thereof connected for pivotal motion with respect to said second section and a second end portion connected for pivotal motion with respect to one of said linear links, said second means one end portion being outwardly and downwardly disposed relative to the second end portion thereof when the first means is in either mode.

3. The releasable locking device of claim 1 wherein the carriage second section includes a pair of laterally spaced, vertically extending plate members; said power-actuated second means, said first means and said linkage assembly being disposed between said plate members.

4. The releasable locking device of claim 1 wherein the third means includes a sensor member adjustably mounted on said first means; when said first means is in said operative mode and in locking engagement with a depending safety bar mounted on the parked vehicle, said sensor member being adapted to be depressed by a safety bar of the parked vehicle and effect actuation of a signal means.

5. The releasable locking device of claim 4 wherein the third means includes a first switch means operatively connected to said signal means and actuated by said sensor member at least when said first means is in locking engagement with the vehicle safety bar.

6. The releasable locking device of claim 4 wherein said sensor member includes an elongate substantially horizontal segment adjustably mounted on said first means for depressing engagement with the vehicle safety bar when said first means is in the operative mode, said horizontal segment assuming a non-depressed raised position with respect to said first means when the latter is in an in operative mode; and a second segment angularly disposed relative to said horizontal segment and proximate said carriage first section; when said horizontal segment is in depressing engagement with the vehicle safety bar, said second segment is in activating engagement with a first switch carried on the carriage second section, said switch controlling a first operation of said signal means.

7. The releasable locking device of claim 6 wherein the horizontal and second segments of said sensor member are substantially integral with one another, when the horizontal segment is moved into depressing engagement by the vehicle safety bar, the second segment of said sensor member moves relative to said first means in a direction towards the carriage first section and into activating engagement with said switch.

8. The releasable locking device of claim 6 wherein said first means, when in an inoperative mode, engages a second switch carried on the carriage second section and spaced beneath said first switch; said second switch being operative independently of said first switch and controlling a second operation of said signal means.

9. The releasable locking device of claim 4 wherein the third means includes a sensor member adjustably mounted on said first means to maintain a substantially parallel relation with respect to a top surface of the first means; when said first means is in said operative mode and in locking engagement with a depending safety bar mounted on the parked vehicle, said sensor member being adapted to be depressed by a safety bar of the parked vehicle and effect actuation of a signal means.

10. The releasable locking device of claim 1 wherein the power-actuated second means includes a piston-cylinder unit.

11. The releasable locking device of claim 10, wherein the piston-cylinder unit includes a cylinder having one end thereof connected for pivotal movement with respect to a lower, outwardly extending segment of said carriage second section, and a piston rod projecting from a second end of said cylinder towards said carriage first section; said rod having an exposed end portion connected for pivotal movement with respect to the first linear link of said linkage assembly.

12. The releasable locking device of claim 1 wherein the carriage second section includes stop means engageable by said linkage assembly for limiting movement of said first means towards said operative mode.

13. The releasable locking device of claim 12 wherein the stop means is selectively adjustable relative to said carriage first section to effect variance of the limits of movement of said first means towards said operative mode.

14. The releasable locking device of claim 12 wherein the stop means limits the movement of said first means towards said inoperative mode.

15. The releasable locking device of claim 1 wherein the first means of the carriage second section includes a substantially hook-shaped member having an elongate first segment extending outwardly from said carriage first section; said first segment having an exposed surface for engaging a depending safety bar of the parked vehicle when said first means is in said operative mode, said surface being substantially transverse to the direction of movement of section; said hook-shaped member having a second segment extending in a substantially upright direction from a distal end portion of said first segment; said second segment maintaining a substantially fixed distance from the carriage first section when said first means is moving between the operative and inoperative modes.

* * * * *